United States Patent
Zitvogel et al.

(10) Patent No.: US 11,511,176 B2
(45) Date of Patent: Nov. 29, 2022

(54) METHOD FOR GENERATING MULTIMEDIA DATA ASSOCIATED WITH A SYSTEM FOR PRACTICING SPORTS

(71) Applicant: Holodia Inc., Dover, DE (US)

(72) Inventors: Olivier Zitvogel, Strasbourg (FR); Konstantin Prinz, Baden (CH)

(73) Assignee: Holodia Inc., Dover, DE (US)

( * ) Notice: Subject to any disclaimer, the term of this patent is extended or adjusted under 35 U.S.C. 154(b) by 370 days.

(21) Appl. No.: 16/493,493

(22) PCT Filed: Mar. 13, 2017

(86) PCT No.: PCT/IB2017/051453
§ 371 (c)(1),
(2) Date: Sep. 12, 2019

(87) PCT Pub. No.: WO2018/167532
PCT Pub. Date: Sep. 20, 2018

(65) Prior Publication Data
US 2020/0269122 A1  Aug. 27, 2020

(51) Int. Cl.
*G06F 3/01* (2006.01)
*A63B 71/06* (2006.01)
*A63B 22/00* (2006.01)
*A63B 24/00* (2006.01)

(52) U.S. Cl.
CPC ...... *A63B 71/0622* (2013.01); *A63B 22/0076* (2013.01); *A63B 24/0062* (2013.01); *G06F 3/011* (2013.01); *A63B 2024/0096* (2013.01); *A63B 2071/0644* (2013.01); *A63B 2071/0666* (2013.01); *A63B 2220/803* (2013.01); *A63B 2225/20* (2013.01); *A63B 2225/50* (2013.01)

(58) Field of Classification Search
CPC ............ A63B 71/0622; A63B 22/0076; A63B 24/0062; A63B 2024/0096; A63B 2071/0644; A63B 2071/0666; A63B 2220/803; A63B 2225/20; A63B 2225/50; G06F 3/011; A63F 13/65; A63F 13/525; A63F 13/803; A63F 13/211; A63F 2300/8082
See application file for complete search history.

(56) References Cited

U.S. PATENT DOCUMENTS

| 6,448,970 B1 * | 9/2002 | Kajioka | A63F 13/10 |
| | | | 345/473 |
| 9,579,060 B1 * | 2/2017 | Lisy | A61B 5/302 |
| 2007/0123390 A1 * | 5/2007 | Mathis | A63F 13/245 |
| | | | 482/8 |

(Continued)

OTHER PUBLICATIONS

Written Opinion dated Dec. 15, 2017 for PCT/IB2017/051453 filed Mar. 13, 2017 (English translation).

(Continued)

*Primary Examiner* — Kieu D Vu
*Assistant Examiner* — Alvaro R Calderon, IV
(74) *Attorney, Agent, or Firm* — Paul D. Bianco; Jose Gutman; Fleit Intellectual Property Law

(57) ABSTRACT

Motion sickness is reduced for users of mechanical systems used to practice sports that comprise an immersive virtual reality device. In particular, the use of prediction and interpolation algorithms enable fluid movements to be displayed within the virtual environment.

13 Claims, 4 Drawing Sheets

(56) References Cited

U.S. PATENT DOCUMENTS

| | | | |
|---|---|---|---|
| 2008/0046179 A1* | 2/2008 | Mackintosh | A63B 24/0021 701/468 |
| 2008/0280736 A1* | 11/2008 | D'Eredita | A63B 21/154 482/72 |
| 2010/0304857 A1* | 12/2010 | Suzuki | A63F 13/10 463/31 |
| 2013/0044043 A1* | 2/2013 | Abdollahi | A42B 3/0433 345/8 |
| 2014/0176296 A1* | 6/2014 | Morgan | G06F 3/011 340/4.13 |
| 2015/0325027 A1* | 11/2015 | Herman | A63F 13/428 345/633 |
| 2016/0228771 A1* | 8/2016 | Watson | A61B 5/4023 |
| 2016/0246061 A1* | 8/2016 | Bickerstaff | H04N 5/23258 |
| 2016/0262608 A1* | 9/2016 | Krueger | G06T 19/006 |
| 2016/0300390 A1* | 10/2016 | Malafeew | A63B 71/0622 |
| 2016/0317866 A1* | 11/2016 | Fung | A63F 13/212 |
| 2016/0317893 A1* | 11/2016 | Kuntz | G06F 3/011 |
| 2017/0178408 A1* | 6/2017 | Bavor, Jr. | G02B 27/017 |
| 2017/0242405 A1* | 8/2017 | Shirai | A63B 71/0686 |
| 2017/0319904 A1* | 11/2017 | Deochand | G06Q 10/0639 |
| 2018/0005312 A1* | 1/2018 | Mattingly | G06F 3/016 |
| 2018/0050257 A1* | 2/2018 | Chen | A63B 24/0087 |
| 2018/0099178 A1* | 4/2018 | Schaefer | A63B 24/0084 |
| 2018/0338709 A1* | 11/2018 | Krans | A61B 5/0022 |
| 2019/0220089 A1* | 7/2019 | Kakizawa | G06T 7/73 |

OTHER PUBLICATIONS

International Preliminary Report on Patentability dated Sep. 17, 2019, for PCT/IB2017/051453 filed Mar. 13, 2017.

Wei Xu et al: "Augmenting Exercise Systems with Virtual Exercise Environment", Nov. 30, 2009 (Nov. 30, 2009), Advances in Visual Computi ng, Springer Berli n H ei delberg, Berlin, Heidelberg, pp. 490-499, XP019134393, ISBN: 978-3-642-10330-8, p. 495, paragraph 4—p. 498.

Tregillus et al,"VR-STEP: Walking-in-Place using Inertial Sensing for Hands Free Navigation in Mobile VR Environments", ACM, May 7, 2016, XP058257178, pp. 1250-1255.

International Search Report dated Dec. 6, 2017 for PCT/IB2017/051453 filed Mar. 13, 2017.

Written Opinion for PCT/IB2017/051453 filed Mar. 13, 2017.

* cited by examiner

METHOD FOR GENERATING MULTIMEDIA DATA ASSOCIATED WITH A SYSTEM FOR PRACTICING SPORTS

FIELD OF THE INVENTION

The present invention relates to the area of mechanical systems for practicing sports comprising an immersion device in virtual reality and more particularly methods making it possible to reduce motion sickness when using such a system.

BACKGROUND OF THE INVENTION

Mechanical systems for practicing sports are systems allowing a user to practice a sporting activity indoors by generally simulating a real sporting activity on a controlled apparatus. It is possible to cite indoor bikes, cross-trainers, indoor rowing machines, treadmills and so on as examples of such systems. These systems are typically made up of the sports apparatus in itself which allows the user to make an effort. This is typically a bicycle, a rowing machine etc. This sports apparatus is coupled with an adjustable resistance which makes it possible to control the effort level which has to be provided by the user when using the sports apparatus. This resistance may assume a variety of forms, it may be, for example, a flywheel slowed down by friction or by an adjustable magnetic field or even oars immersed in water, the movement of which slows down the movement of the sports apparatus as is the case in certain indoor rowing machines.

Nowadays, the adjustment of the resistance is generally controlled by a computer controlling the activity. This control computer allows the display of different activity programs and the display of a human-machine interface making it possible to choose one's program and thus to act on the level of resistance. The functions of the control computer are complemented by functions for monitoring and establishing statistics on the activity sessions, monitoring the user's heart rate etc.

Virtual reality is a visual or auditive, immersive, interactive, computer-based simulation of real or imaginary environments. The purpose of virtual reality is to provide someone (or several people) with a sensory-motor and cognitive activity in an artificial world, created digitally, which may be imaginary, symbolic or a simulation of certain aspects of the real world.

Coupled with a mechanical system for practicing sports, virtual reality makes it possible to simulate the sporting activity in a virtual environment which can, for example, simulate an outdoor activity. Thus, the activity is made more entertaining and enjoyable than an activity in a fixed indoor environment.

Despite numerous possible applications, the use of virtual reality is not yet widespread and attempts to market a product based on virtual reality have been hampered by a recurring problem: motion sickness or cybersickness.

Motion sickness or cybersickness occurs when being exposed to a virtual environment brings about symptoms which are similar to the symptoms of travel sickness. This syndrome causes dizziness, headaches, feelings of disorientation, nausea etc. It can occur during the virtual experience, but equally when returning to reality and may last for several hours.

Motion sickness is different from travel sickness in that it can be caused by the visual perception of movements without an actual movement of the user being necessary. Motion sickness is the critical point limiting the launch of commercial applications based on virtual reality.

SUMMARY OF THE INVENTION

One aspect of the present invention relates to addressing the aforementioned drawbacks and more particularly to reduce motion sickness in the user of a mechanical system for practicing sports comprising an immersion device in virtual reality. The invention is based on the use of prediction and interpolation algorithms allowing the display of a fluid movement within the virtual environment.

The invention relates to a method for generating multimedia data by a virtual environment generator associated with a mechanical system for practicing sports and for a virtual reality headset characterized in that it comprises:
  a step of receiving kinetic samples at a first regular or irregular frequency, these kinetic samples being representative of a position of the user in a movement estimated to come from the use of the mechanical system for practicing sports during an exercise session;
  a step of determining a camera position within a virtual environment, said position representing the position of said user in the virtual environment, said determination being carried out at a second regular frequency, called display frequency, higher than the first frequency and by interpolating the received position of the user;
  a step of generating multimedia data corresponding to the camera position at the display frequency.

According to a particular embodiment, the step of determining the camera position comprises:
  a step of calculating at the first frequency an instantaneous speed corresponding to the speed of the user between the last received sample and the previous one.

According to a particular embodiment, the method further comprises:
  a step of determining an instantaneous speed adjusted from the instantaneous speed, of the simulated position of the user in the virtual environment and of the position received in the last sample, this step being carried out at the first frequency.

According to a particular embodiment, the method further comprises:
  a step of determining the camera position at the display frequency as a function of the previous camera position and of the adjusted instantaneous speed.

According to a particular embodiment, the method further comprises:
  a step of determining the end of the movement when an elapsed period of time without receiving a new kinetic sample is greater than a threshold depending on the average temporal interval between two kinetic samples.

According to a particular embodiment, the method further comprises:
  a step of transcribing the body movements made by the user to the camera movements in the virtual environment.

According to a particular embodiment, the mechanical system for practicing sports being an indoor rowing machine, the method further comprises:
  a step of reversing the direction of movement.

The invention also relates to a system for practicing sports comprising:
  a mechanical system for practicing sports;
  a virtual environment generator associated with the mechanical system for practicing sports; and a virtual reality headset connected to the virtual environment generator;

characterized in that the virtual environment generator comprises:

means of receiving kinetic samples at a first regular or irregular frequency, these kinetic samples being representative of a position of the user in a movement estimated to come from the use of the mechanical system for practicing sports during an exercise session;

means of determining a camera position within a virtual environment, said position representing the position of said user in the virtual environment, said determination being carried out at a second regular frequency, called display frequency, higher than the first frequency and by interpolating the received position of the user;

means of generating multimedia data corresponding to the camera position at the display frequency.

According to a particular embodiment, the virtual reality headset has an OLED display.

According to a particular embodiment, the virtual reality headset has a field of vision of less than 180 degrees.

According to a particular embodiment, the system comprises a hardware adjustment for adjusting the interpupillary distance.

The invention also relates to a computer program comprising instructions adapted to the implementation of each of the method steps according to the invention when said program is executed on a computer.

The invention also relates to a means of storing information, either removable or non-removable, partially or completely readable by a computer or a microprocessor comprising code instructions of a computer program for executing each of the method steps according to the invention.

In a particular embodiment, steps of the abovementioned method are determined by computer program instructions.

Consequently, the invention also relates to a computer program on a storage medium, this program being capable of being implemented by a microprocessor, this program comprising instructions adapted to the implementation of the method steps as mentioned above.

This program may use any programming language and be in the form of source code, object code, intermediate code between source code and object code, such as in a partially compiled form, or in any other desirable form.

The invention also relates to a storage medium readable by a microprocessor, and comprising instructions of a computer program as mentioned above.

The storage medium may be any entity or device capable of storing the program. For example, the medium may comprise a storage means, such as a ROM, for example a ROM chip, or else a magnetic recording medium, for example a hard drive, or else a flash memory.

Furthermore, the storage medium may be a transmitted medium such as an electrical or optical signal which may be sent via an electric or optical cable, by radio or by other means. The program according to the invention may be in particular downloaded on a storage platform of a network such as the Internet.

Alternatively, the storage medium may be an integrated circuit in which the program is incorporated, the circuit being adapted to execute or to be used in the execution of the method in question.

The abovementioned storage medium and computer program have features and advantages similar to the method which they implement.

BRIEF DESCRIPTION OF THE DRAWINGS

Other features and advantages of the invention will become apparent in the description hereinafter in relation to the appended drawings, given by way of non-limiting examples.

DETAILED DESCRIPTION OF THE INVENTION

Motion sickness is triggered in users of virtual reality for several different reasons, some of them technical, others due to the way the human body functions. Among the predominant causes which induce\ motion sickness when using immersive virtual reality, we can name the follow causes:

The functional mismatch between the visual experience and the motor activity. This first cause is one of the main ones and occurs when the virtual environment does not react coherently with the actual movements of the user of the mechanical system for practicing sports. This occurs, for example, when there is an excessive delay between a movement of the user and the display of the consequence of this movement in the virtual environment.

Another cause of motion sickness is an effect of blurring or jerkiness which brings about a discrepancy between the virtual experience and the vision in the real world.

Motion sickness also occurs when the virtual image displayed does not respect the human eye's field of vision. The use of wider or narrower viewing angles triggers a mismatch in the brain.

Postural instability during the virtual reality experience may occur when the position of the body which naturally tends to readjust its position to align itself upright is inconsistent with the virtual environment. In this case, there is an inconsistency between the perceived visual information and the information of the user's inner ear. This postural instability triggers motion sickness.

People have a variable interpupillary distance of around 62 mm. This distance may vary slightly from person to person. The result of this variation is a blurry sensation with respect to the perceived image and a rejection of the virtual experience by the user, causing motion sickness.

Finally, when the transition between the virtual world and the real world is too quick, users complain of experiencing nausea and dizziness, which are typical of motion sickness.

Figure 1:
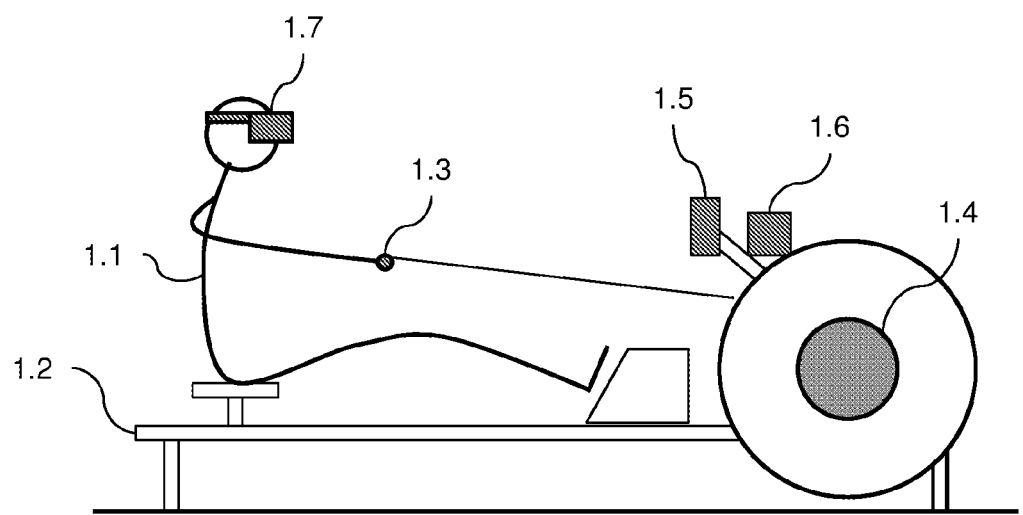
FIG. 1 shows an example of a system for practicing sports according to the invention.

FIG. 1 shows an example of a system for practicing sports according to the invention. A user 1.1 uses an indoor rowing machine 1.2. This rowing machine 1.2 comprises a kinetic actuator 1.3 which allows them to instigate a movement typically by pulling on the actuator connected by a strap to a kinetic sensor. 1.4. The sensor offers resistance to the movement, said resistance being controlled by a control computer 1.5. This control computer in addition to the control of the device's resistance records the parameters of the movement, tensile force, number of strokes per minute, extent of pulling and other information conveyed by the kinetic sensor 1.4. Based on these parameters, it calculates statistical information aimed at the user and displays it on the control screen incorporated in the control computer 1.5. As part of the invention, the mechanical system for practicing sports also comprises a virtual environment generator 1.6. Given that the user is provided with a viewing headset 1.7, the virtual environment generator 1.6 obtains a range of parameters on the movement generated by the action of the user from the control computer 1.5. For example, it is possible to regularly obtain the position of the user as well as the time elapsed since the beginning of the session. A session is defined as the period of time between the user starting to use the system and stopping. These movement parameters may be obtained either upon request from the virtual environment generator or issued more or less regularly by the control computer according to the models of the mechanical systems for practicing sports.

The control computer and the virtual environment generator are two devices for processing information which are programmed specifically for the function to be carried out. They are typically devices such as the one shown in FIG. 5 and described below. The person skilled in the art likewise understands that in certain embodiments, the functions of the control computer and virtual environment generator may be carried out by one and the same device for processing information without modifying their operating mode.

This is just one example; an exercise bicycle, a crosstrainer or a treadmill could be used in the same way.

Figure 2:
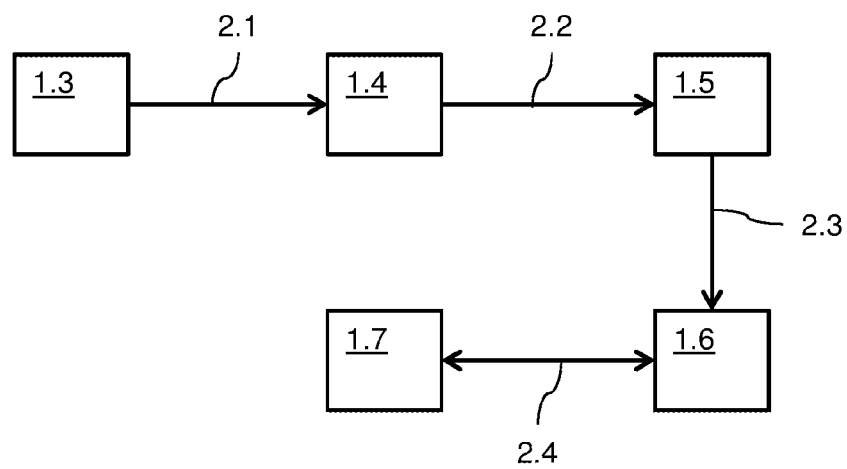
FIG. 2 shows the functional relationships between the different components of the system according to one exemplary embodiment of the invention.

FIG. 2 shows the functional relationships between the different components of the system according to one exemplary embodiment of the invention.

The kinetic actuator 1.3 allows the user to instigate the movement on the mechanical system for practicing sports. This movement is transmitted, arrow 2.1, to the inertial sensor 1.4. This transmission is typically mechanical, for example via a pull strap in the case of a rowing machine. It may be a drive chain pedal unit in the case of an exercise bicycle.

The inertial sensor 1.4 captures mechanical movement and transforms it into a digital datum of movement which is transmitted, arrow 2.2, to the control computer 1.5. The transmission may assume any form known by the person skilled in the art, wired or wireless, allowing the transmission of a digital signal between the sensor and the control computer 1.5, for example a serial bus, a simple cable transmitting modulated digital information or a Bluetooth link etc.

The control computer 1.5 therefore uses this movement information to carry out, inter alia, an assessment of movement. This assessment of movement uses the movement as well as a model making it possible to assess the movement that a real boat experiencing the same effort from a rower would have. The way in which this assessment is carried out is not the subject of this document and will not be described further here. This assessment allows the control computer 1.5 to transmit this information, arrow 2.3 to the virtual environment generator 1.6. This transmission may be periodic according to the control computer's own frequency or generated by an event. For example, certain exercise bicycles transmit the movement information with each turn of the wheel by the user. It is understood in this situation that the transmission is irregular and unpredictable. In still other cases, the transmission may be carried out upon request of the virtual environment generator. In this case, the latter is in charge of the transmission frequency within the limits of the control computer's capabilities. The control computer generally imposes a maximum frequency which cannot be exceeded. Here too, the transmission may be carried out by any means. It may be a wired transmission, for example USB, Ethernet or serial connection. It may be a wireless transmission, for example Bluetooth or Wifi. It may also be any means of inter-process communication when the two functions of the control computer and virtual environment generator are carried out by the same device for processing information.

Typically, the virtual reality headset 1.7 also transmits movement information to the virtual environment generator 1.6. This information relates to the head movements made by the user and is integrated into the movement information received by the control computer 1.5 for the generation of the virtual environment.

Other sensors may be used to retrieve various information on the user's movements and/or their environment:
 sensors installed on the user: accelerometer, magnetometer, gyroscope, sensors of physiological features (for example, heart rate, respiratory rate, body temperature, blood pressure, oxygen saturation etc.)
 distant sensors such as the camera (whatever the spectrum), sonar, electromagnetic sensors etc.

Using this movement information, the virtual environment generator 1.6 updates the position of the user in the environment. This essentially involves locating the camera in a three-dimensional environment. Then, with the position of the camera having been determined, the images viewed by this camera are generated to be sent back to the virtual reality headset 1.7 with the sound accompanying the scene. The virtual reality headset is typically a three-dimensional viewing headset equipped with headphones. The images generated are therefore typically three-dimensional images comprising an image intended for each of the user's eyes.

The transmission 2.4 between the headset and the virtual environment generator may be carried out by any means. It may be a wired transmission, for example USB, Ethernet or serial connection. It may be a wireless transmission, for example Bluetooth or Wifi.

Figure 3:
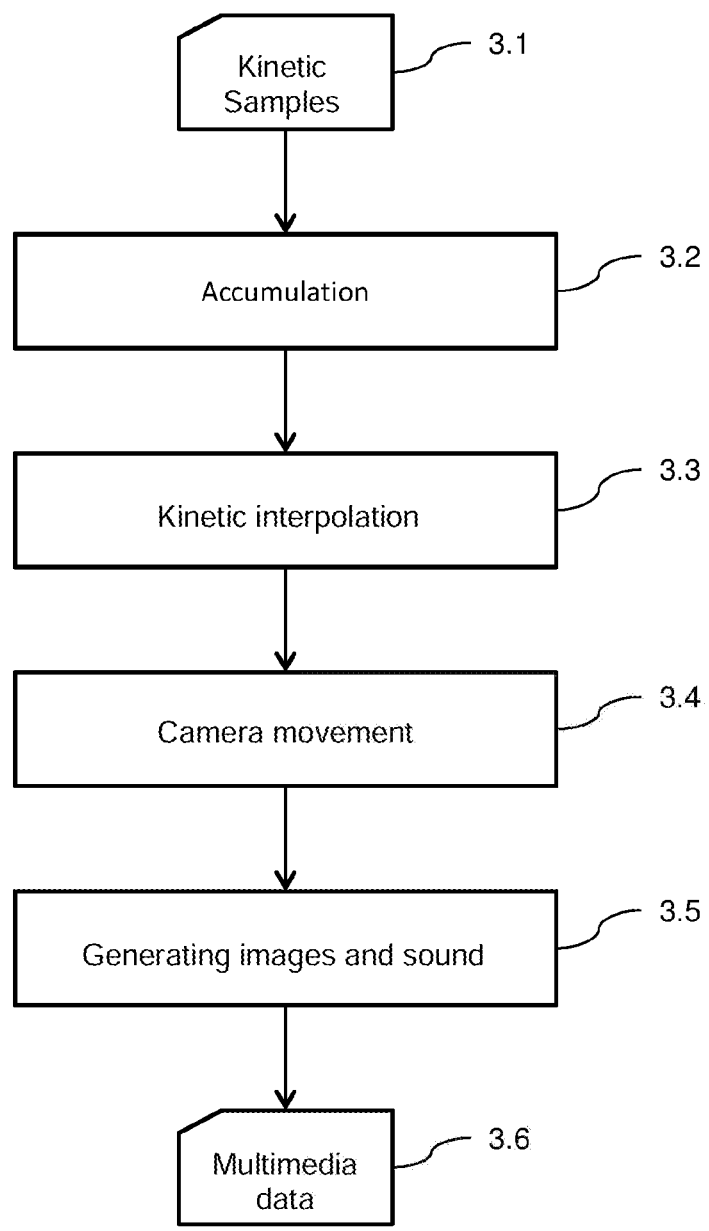
FIG. 3 shows the method for generating multimedia data in one exemplary embodiment of the invention.

FIG. 3 shows the method for generating multimedia data in an exemplary embodiment of the invention. These data are generated for the virtual reality headset based on the movement data transmitted by the control computer.

The kinetic samples 3.1 are made up of the data transmitted by the control computer. A sample corresponds to a transmission of data. The specific contents of the data transmitted may vary between the different mechanical systems for practicing sports. In any case, these data are representative of a position of the user in a movement estimated to come from the use of the mechanical system for practicing sports during an exercise session. In the exemplary embodiment based on an indoor rowing machine, the data transmitted comprise a distance traveled and an associated timestamp which gives the date relative to the start of the session when this distance was traveled virtually by the user using the mechanical system for practicing sports.

The accumulation step 3.2 allows the virtual environment generator to store the received samples. These samples are transmitted according to a temporal frequency which may or may not be regular. The accumulation makes it possible to store these samples when they arrive for their subsequent use.

The kinetic interpolation step 3.3 makes it possible to carry out an interpolation between the samples in order to generate a sufficient frequency of samples to obtain a fluid simulation of the movement in the virtual environment. The details of this interpolation will be described later on in relation to FIG. 4. In fact, the transmission frequency of the samples is typically inadequate and without interpolation would lead to a jerky movement of the camera in the virtual environment.

Step 3.4 determines the movement of the camera in the virtual environment as a function of the interpolated samples. The camera position represents the position of the user in the virtual environment corresponding to their activity on the mechanical system for practicing sports. The movement of the camera also incorporates the head movement data transmitted by the headset and/or the body movement data transmitted by other position sensors. This aspect is not developed in the present document but is essential for preserving the coherence between the actual movements of the user and the virtual movements.

Step 3.5 therefore consists in generating the images and possibly the sound corresponding to the new camera position in the virtual environment. These images and the sound represent the virtual environment such as it is viewed by the camera. These data constitute the multimedia data 3.6 that will be transmitted to the user in order to be reproduced by the headset, thus immersing the user in the virtual world.

Figure 4:
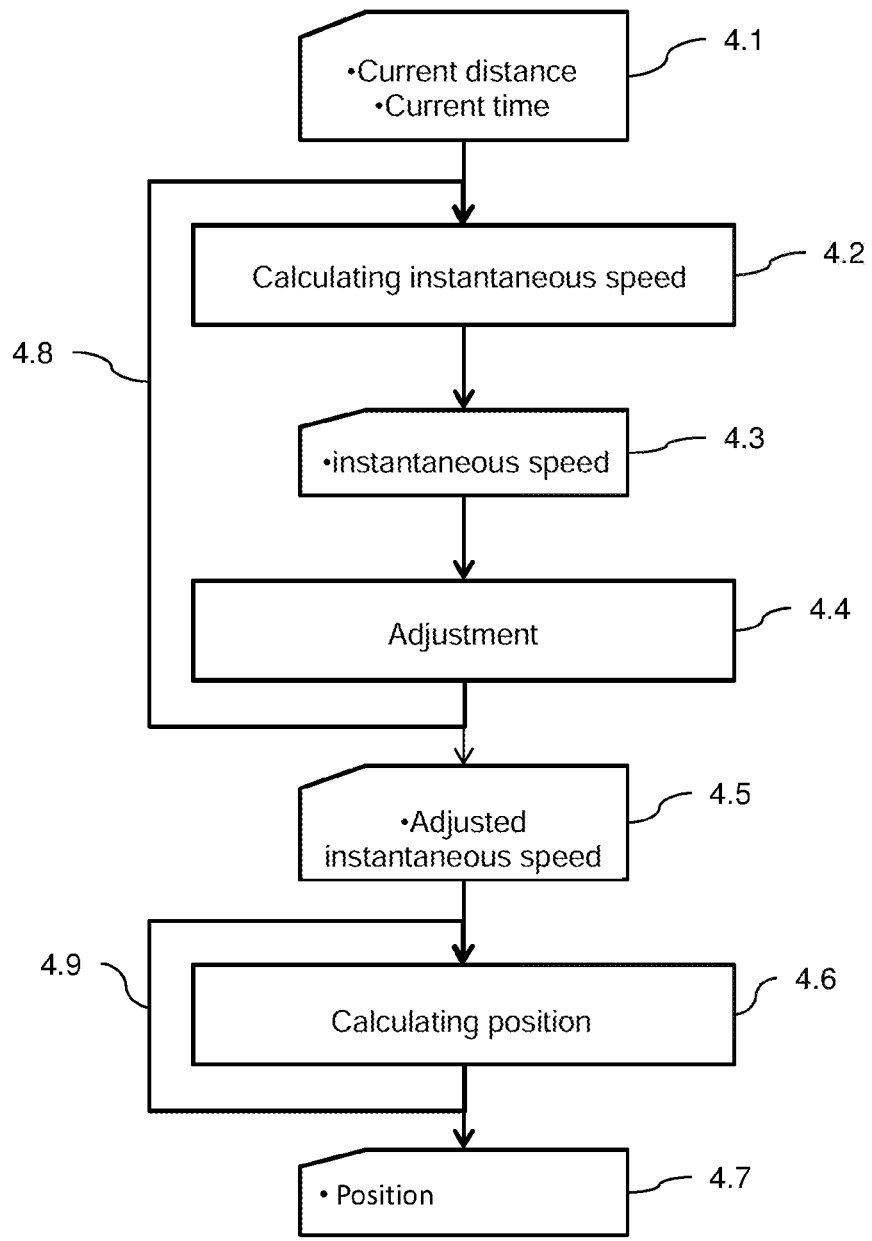
FIG. 4 shows the interpolation method according to one exemplary embodiment of the invention.

FIG. 4 shows the interpolation method according to an exemplary embodiment of the invention.

One of the main causes of motion sickness is the lack of fluidity of camera movements in the virtual environment. If the image is jerky, the perceived movement is no longer consistent with the movements of the user and confuses their inner ear. Yet, the samples transmitted by the control computer of the mechanical system for practicing sports are transmitted with a frequency which is generally not high, typically in the order of 50 Hz for a rowing machine or even between 0.5 Hz and 2 Hz for a bicycle transmitting a sample upon each turn of the pedal. Experience shows that an image refresh carried out by the virtual reality headset greater than or equal to 60 Hz is desirable in order to reduce the risk of motion sickness. In the exemplary embodiment, the refresh frequency is 75 Hz. In order to obtain fluid movements at the display refresh frequency, it is therefore necessary to proceed with an interpolation of the camera positions and to not simply update this position when a new sample is transmitted.

The interpolation method accepts the movement data 4.1 transmitted by the control computer. These data comprise in the exemplary embodiment a current distance and the timestamp of the current time.

The interpolation method can be broken down into two distinct modules which are not carried out at the same frequency. A first module, symbolized by the arrow 4.8 is carried out at the transmission frequency of the samples, this transmission frequency possibly being irregular and unpredictable. It consists in calculating an adjusted instantaneous speed 4.5. Next, a second module symbolized by the arrow 4.9 uses this adjusted instantaneous speed to produce a camera position 4.7 at the display frequency, which is 75 Hz in the exemplary embodiment.

When a sample is received, a step 4.2 makes it possible to calculate the instantaneous speed based on the movement data of the received sample and the movement data of the previous sample. The instantaneous speed corresponds to the speed of the user between the last received sample and the previous one. First of all, the difference of the distances traveled between the two samples is calculated, delta_distance=current_distance−previous_distance. The time difference separating the two sample is then calculated, delta_time=current_time−previous_time. The instantaneous speed 4.3 therefore corresponds to the ratio of the two, instantaneous_speed=delta_distance/delta_time.

The instantaneous speed is used to update the position of the user at the display frequency whilst waiting for a new sample to be received. When it arrives, it is probable that the simulated position of the user in the virtual environment is late or early compared with the position received in the last sample. In order to avoid the accumulation of these estimation errors, it is appropriate to adjust the movement speed estimated when a new sample is received, that is to say to reduce it if the estimation is early or to increase it if the estimation is late. The adjustment step 4.4 makes it possible to calculate an adjusted instantaneous speed 4.5. This adjustment prevents the position calculated in the virtual environment from deviating with respect to the position transmitted by the samples without causing jerkiness as a sudden recalibration would when receiving the sample. Typically, the adjustment consists in applying an adjustment coefficient to the instantaneous speed as a function of the deviation between the new received sample and the estimated position. This adjustment coefficient is less than 1 when the new sample is early and more than 1 when the new sample is late. In the exemplary embodiment, the adjustment coefficient is comprised between the values 0.8 and 1.2. The adjustment coefficient assumes the maximum values 0.8 or 1.2 when the deviation between the received sample and the estimated position is greater than 1 meter. It progresses in a linear fashion between the two limits as a function of the deviation for deviations less than or equal to 1 meter. Of course, these numerical values constitute an example within the context of a rowing machine and could be different depending on the type of system for practicing sports considered and the frequency of the samples.

It is therefore this instantaneous speed 4.5 which is used by step 4.6 to determine the current camera position at the display frequency in the virtual environment. The camera position is then updated at the refresh frequency according to the following formula: position=previous_position+ adjusted*dt instantaneous speed, in which dt stands for the time between two refreshes, i.e. 13.3 ms for a frequency of 75 Hz.

Certain mechanical systems for practicing sports only transmit samples when the user is moving, for example a bicycle which transmits a sample upon each turn of the peddle. For these systems, only the detection of not receiving a sample makes it possible to detect that the user has stopped. Advantageously, a step of determining the stop is therefore added to this method. For example, the stop is determined when an elapsed period of time without receiving a new kinetic sample is greater than a threshold depending on the average temporal interval between two kinetic samples. For example, the threshold may be defined as corresponding to three times the average temporal interval between two kinetic samples.

Thus, a fluid movement at the sufficient display frequency is generated which allows the risk of triggering motion sickness in the user to be reduced. This risk is further reduced by the use of a headset using an OLED screen having a low persistence of vision although any other display technology may be used.

Advantageously, the headset used has a field of vision of less than 180 degrees, thus respecting the fields of vision to which the brain is accustomed, which likewise reduces the risk of motion sickness occurring.

Postural instability during the virtual reality experience is counteracted by transcribing the body movements made by the user to the camera movements in the virtual environment. Thus, the visual information and that of the inner ear are matching at all times.

Advantageously, the system is provided with a hardware adjustment, for example at the level of the headset, for adjusting the interpupillary distance and thus perfectly adapting the three-dimensional experience to the user's morphology.

In order to ease the transitions between the real world and the virtual world, the system has transition spaces. This area enables the user to get used to the virtual experience and to carry out their preliminary adjustments before launching the simulation.

In the case of an indoor rowing machine, logic dictates that the user has their back to the direction of travel of the boat which they operate in the virtual environment. It turns out that this way of advancing in the virtual environment is not comfortable and may contribute to the occurrence of motion sickness. Reversing the direction of travel of the virtual boat and thus advancing with the user facing the direction of movement does not cause any discomfort for the user and actually reduces the risk of motion sickness occurring. Advantageously, the virtual environment generator therefore incorporates a reversal of the direction of movement in the case of an indoor rowing machine.

Figure 5:
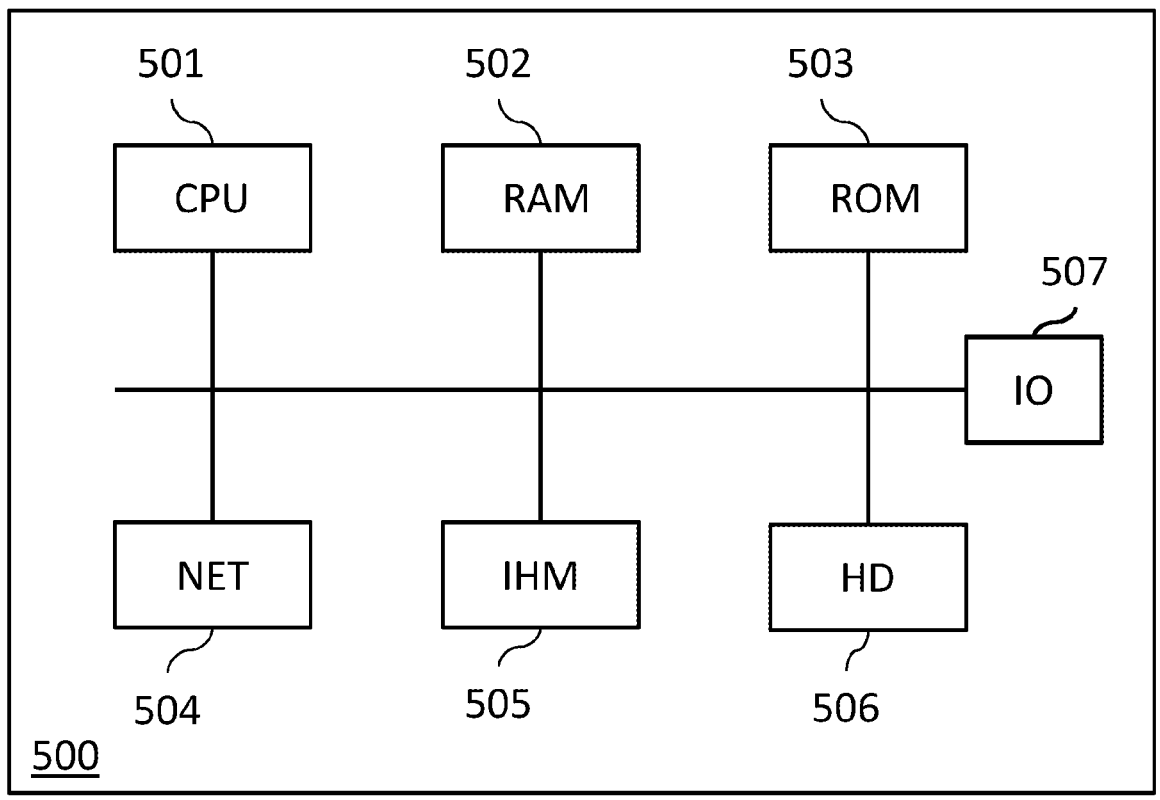
FIG. 5 is a schematic block diagram of a device for processing information for the implementation of one or several embodiments of the invention.

FIG. 5 is a schematic block diagram of a device for processing information 500 for the implementation of one or several embodiments of the invention. The device 500 for processing information may be a peripheral device such as a microcomputer, a workstation or a mobile telecommunication terminal. The device 500 comprises a communication bus connected to:

- a central processing unit 501, such as a microprocessor, called CPU;
- a random-access memory 502, called RAM, to store the executable code of the method of performing the invention as well as the registers adapted to record variables and parameters which are necessary for the implementation of the method according to embodiments of the invention; its storage capacity may be complemented by an optional RAM memory connected to an extension port, for example;
- a read-only memory 503, called ROM, to store IT programs for the implementation of the embodiments of the invention;
- a network interface 504 is normally connected to a communication network on which digital data to be processed are transmitted or received. The network interface 504 may be a single network interface or composed of a set of different network interfaces (for example wired and wireless, interfaces or different types of wired or wireless interfaces). Data packets are sent on the network interface for the transmission or are read from the network interface for being received under the control of the software application executed in the processor 501;
- a user interface 505 for receiving inputs of a user or for displaying information to a user;
- an optional storage medium 506 called HD;
- an input/output module 507 for receiving/sending data from/to external peripheral devices such as hard drive, removable storage medium or others.

The executable code may be stored in a read-only memory 503, on the storage medium 506 or on a digital removable medium such as a disk, for example. According to one version, the executable code of the programs may be received by means of a communication network, via the network interface 504, in order to be stored in one of the storage means of the communication device 500, such as the storage medium 506 before being executed.

The central processing unit 501 is adapted to control and direct the execution of the instructions or the portions of software code of the program or programs according to one of the embodiments of the invention, instructions which are stored in one of the aforementioned storage means. After being powered up, the CPU 501 is capable of executing instructions stored in the main RAM memory 502, relative to a software application, after these instructions have been loaded from the ROM for example. Such a software, when it is executed by the processor 501, triggers the steps in the flow charts illustrated in figures X to Y in order to be executed.

In this embodiment, the device is a programmable device which uses a software to implement the invention. However, in the alternative, the present invention may be implemented in hardware (for example, in the form of an application-specific integrated circuit or ASIC).

Of course, in order to meet specific needs, a skilled person in the field of the invention will be able to apply modifications in the preceding description.

Although the present invention has been described above in reference to specific embodiments, the present invention is not limited to the specific embodiments, and the modifications which are in the scope of application of the present invention will be obvious for a person skilled in the art.

The invention claimed is:

1. A method for generating multimedia data for a three-dimensional virtual reality headset, the multimedia data representative of a user carrying out a physical activity within a three-dimensional virtual environment while the user uses a mechanical system in reality, the method comprising:

using at least one electronic processor for:
a) digitally creating, by a virtual environment generator, the three-dimensional virtual environment that is at least one of an imaginary representation, symbolic representation, or a simulation of certain real world aspects, the three-dimensional virtual environment viewable by the three-dimensional virtual reality headset as a series of three-dimensional images refreshed and displayed at an image display refresh frequency;
b) receiving kinetic samples at a first regular or irregular frequency, the received kinetic samples associated with physical movement of the user derived from use of the mechanical system while carrying out the physical activity, the kinetic samples being representative of a position of the user in a movement of the user in the three-dimensional virtual environment;
c) interpolating additional kinetic samples between successive received kinetic samples and generating the additional kinetic samples at the image display refresh frequency which is a higher frequency than the first regular or irregular frequency;
d) repeatedly determining a camera position within the virtual environment at the image display refresh frequency, the camera position determined at an occurrence of each of the received kinetic samples and at a time of each of the interpolated additional kinetic samples and representing the position of the user position and a field of view in the virtual environment, wherein movement of the camera is based on
i) a calculated instantaneous speed of movement of the camera position calculated at the occurrence of each successive received kinetic sample, and ii) an adjustment to the calculated instantaneous speed at a current camera position upon an occurrence of a latest received kinetic sample
to increase a speed of movement of the camera position when the current camera position is late relative to a coinciding camera position that coincides with a position of the latest received kinetic sample, or
to decrease the speed of movement of the camera position when the current camera position is early relative to the coinciding camera position that coincides with the position of the latest received kinetic sample, and
iii) user head movement data transmitted by the virtual reality headset and user body movement data transmitted by one or more position sensors; and
e) generating the multimedia data comprising three-dimensional images viewed by a camera at the camera position based on a combination of the position of the user and the field of view in the created virtual environment, as represented by the camera position, and the created virtual environment, for display at the image display frequency, the multimedia data used by the virtual reality headset to display the three-dimensional images including a separate set of images respectively displayed by the virtual reality headset for each of the user's eyes.

2. The method of claim 1,
wherein determining the camera position comprises calculating, using the first frequency, a first instantaneous speed derived from a difference between a time and physical position of the user corresponding to a later received sample and the time and physical position of the user corresponding to an earlier received sample.

3. The method of claim 2, wherein the method further comprises:
determining an adjusted instantaneous speed derived from a difference between the first instantaneous speed and the time and physical position of the user corresponding to a subsequent sample, wherein determining the adjusted instantaneous speed is calculated using the first frequency.

4. The method of claim 3, wherein the method further comprises:
determining the camera position at the display frequency as a function of the camera position and of the adjusted instantaneous speed.

5. The method of claim 1, wherein the method further comprises:
determining that the movement has stopped when an elapsed period of time without receiving a new kinetic sample is greater than a threshold depending on an average temporal interval between two received kinetic samples.

6. The method of claim 1, wherein the mechanical system for carrying out the physical activity is an indoor rowing machine and the method further comprises moving a virtual boat in a reverse direction within the virtual environment with respect to a direction of a rowing motion of the user on the indoor rowing machine.

7. The method of claim 1,
wherein the at least one electronic processor executes a computer program comprising instructions adapted to implement the method steps (a)-(e).

8. The method of claim 1, further including
storing information in non-volatile storage media, either removable or non-removable, the information including computer instructions that when executed by the at least one electronic processor perform the method steps (a)-(e).

9. The method of claim 1, wherein the camera position is adjusted to match a posture of the user as determined with an electronic device worn by the user.

10. A system for displaying, using a three-dimensional virtual reality viewing headset, a physical activity of a user in a three-dimensional virtual environment, the physical activity being carried out by the user in reality, the system comprising:
a mechanical system used by the user when carrying out the physical activity;
a virtual environment generator associated with the mechanical system for digitally generating the three-dimensional virtual environment that is at least one of an imaginary representation, symbolic representation, or a simulation of certain real world aspects;
a three-dimensional virtual reality viewing headset connected to the virtual environment generator, the three-dimensional virtual environment viewable by the user using the three-dimensional virtual reality viewing headset as a series of three-dimensional images refreshed and displayed at an image display refresh frequency; and
a kinetic actuator;
wherein the virtual environment generator includes:
one or more sensors connected to the kinetic actuator which generate kinetic samples at a first regular or irregular frequency, the generated kinetic samples being representative of a position of the user in a movement of the user in the three-dimensional virtual environment, the movement being derived from use of the kinetic actuator by the user while the user carries out the physical activity;
an electronic processor connected to the one or more sensors and which, in response to executing computer instructions,
receives the kinetic samples from the one or more sensors;
interpolates additional kinetic samples between successive received kinetic samples to generate the additional kinetic samples at the image display refresh frequency which is a higher frequency than the first regular or irregular frequency;
repeatedly determines a camera position within the virtual environment, at the image display refresh frequency, the camera position determined at an occurrence of each of the received kinetic samples and at a time of each of the interpolated additional kinetic samples and representing the position of the user position and a field of view in the virtual environment, wherein movement of the camera is based on
i) a calculated instantaneous speed of movement of the camera position calculated at the occurrence of each successive received kinetic sample, and
ii) an adjustment to the calculated instantaneous speed at a current camera position upon an occurrence of a latest received kinetic sample
to increase speed of movement of the camera position when the current camera position is late relative to a coinciding camera position that coincides with a position of the latest received kinetic sample, or
to decrease the speed of movement of the camera position when the current camera position is early relative to the coinciding camera position that coincides with the position of the latest received kinetic sample, and iii) user head movement data transmitted by the virtual reality headset and user body movement data transmitted by one or more position sensors; and generates multimedia data comprising three-dimensional images viewed by a camera at the camera position based on a combination of the position of the user and the field of view in the created virtual environment, as represented by the camera position, and the created virtual environment, for display at the image display refresh frequency, the multimedia data used by the virtual reality viewing headset to display the three-dimensional images including a separate set of images respectively displayed by the virtual reality viewing headset for each of the user's eyes.

11. The system of claim 10, wherein the virtual reality viewing headset has an OLED display.

12. The system of claim 10, wherein the virtual reality viewing headset has a field of vision of less than 180 degrees.

13. The system of claim 10, wherein the system includes a device for determining and adjusting interpupillary distance at the virtual reality viewing headset.

\* \* \* \* \*